(12) United States Patent
Gotoh et al.

(10) Patent No.: US 10,817,820 B2
(45) Date of Patent: *Oct. 27, 2020

(54) FACILITATING PROVISIONING IN A MIXED ENVIRONMENT OF LOCALES

(71) Applicant: International Business Machines Corporation, Armonk, NY (US)

(72) Inventors: Yasuhisa Gotoh, Kanagawa-ken (JP); Takeshi Akamatsu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,997

(22) Filed: Feb. 10, 2020

(65) Prior Publication Data

US 2020/0175452 A1    Jun. 4, 2020

Related U.S. Application Data (63) Continuation of application No. 15/011,319, filed on Jan. 29, 2016, now Pat. No. 10,600,014, which is a
(Continued)

(30) Foreign Application Priority Data

Feb. 28, 2007  (JP) .................................. 2007-50740

(51) Int. Cl.
*G06Q 10/06*      (2012.01)
*G06F 9/50*       (2006.01)
(Continued)

(52) U.S. Cl.
CPC ....... *G06Q 10/06316* (2013.01); *G06F 9/454* (2018.02); *G06F 9/5027* (2013.01); *G06F 9/5066* (2013.01); *G06F 40/58* (2020.01)

(58) Field of Classification Search
CPC .... G06F 9/4448; G06F 9/5055; G06F 17/289; G06F 9/5027; G06F 9/505; G06F 8/20; G06F 9/454
See application file for complete search history.

(56) References Cited

U.S. PATENT DOCUMENTS

| | | |
|---|---|---|
| 5,613,122 A | 3/1997 | Burnard et al. |
| 5,664,206 A | 9/1997 | Murow et al. |

(Continued)

FOREIGN PATENT DOCUMENTS

| | | | |
|---|---|---|---|
| JP | 2000035882 A | 2/2000 | |
| JP | 2000187570 A | 7/2000 | |

(Continued)

OTHER PUBLICATIONS

Tivoli Intelligent Orchestrator, Workflow Developer's Guide, version 3.1, first printing, IBM Japan, Ltd., Jun. 2005, pp. 11 to 31 (manual2007-01782-001).

(Continued)

*Primary Examiner* — Keith E Vicary
(74) *Attorney, Agent, or Firm* — The Steadman Law Firm PLLC (57) ABSTRACT

Aspects capable of dynamically and flexibly supporting a plurality of locales upon provisioning are provided. An associated management server includes a storage table configured to store a plurality of logical device operations, a plurality of locales, and a plurality of workflows, wherein each resource server among all resource servers connected to the management server is associated with a different one of the plurality of locales. The management server further includes a provisioning circuit configured to dynamically determine, for a required logical device operation, a resource server among all of the resource servers connected to the management server by way of provisioning. The management server further includes a calling circuit configured to
(Continued)

search the storage table using a locale among the plurality of locales that is associated with the dynamically determined resource server to select a workflow from the plurality of workflows for the required logical device operation.

16 Claims, 8 Drawing Sheets

Related U.S. Application Data continuation of application No. 14/288,020, filed on May 27, 2014, now Pat. No. 9,317,828, which is a continuation of application No. 12/038,722, filed on Feb. 27, 2008, now abandoned.

(51) Int. Cl.
*G06F 9/451* (2018.01)
*G06F 40/58* (2020.01)

(56) References Cited

U.S. PATENT DOCUMENTS

| | | | |
|---|---|---|---|
| 5,838,972 | A | 11/1998 | Matsuzuka et al. |
| 6,167,567 | A | 12/2000 | Chiles et al. |
| RE37,722 | E | 5/2002 | Burnard et al. |
| 6,704,362 | B2 | 3/2004 | Peng et al. |
| 6,859,820 | B1 | 2/2005 | Hauduc et al. |
| 6,865,716 | B1 | 3/2005 | Thurston |
| 6,993,568 | B1 | 1/2006 | Hauduc et al. |
| 9,317,828 | B2 | 4/2016 | Gotoh et al. |
| 10,600,014 | B2 * | 3/2020 | Gotoh .................. G06F 9/5066 |
| 2002/0013173 | A1 | 1/2002 | Walker et al. |
| 2002/0080200 | A1 | 6/2002 | Wong et al. |
| 2002/0107684 | A1 | 8/2002 | Gao |
| 2002/0162090 | A1 | 10/2002 | Parnell et al. |
| 2002/0162093 | A1 | 10/2002 | Zhou et al. |
| 2002/0174065 | A1 | 11/2002 | Coward |
| 2002/0184308 | A1 | 12/2002 | Levy et al. |
| 2003/0160810 | A1 | 8/2003 | Talley et al. |
| 2003/0208470 | A1 | 11/2003 | MacLellan et al. |
| 2004/0030554 | A1 | 2/2004 | Boxberger-Oberoi et al. |
| 2004/0168132 | A1 | 8/2004 | Travieso et al. |
| 2005/0009538 | A1 | 1/2005 | MacKay et al. |
| 2005/0055696 | A1 | 3/2005 | Betzler et al. |
| 2005/0060378 | A1 | 3/2005 | Girard et al. |
| 2005/0097256 | A1 | 5/2005 | Jones |
| 2005/0114446 | A1 | 5/2005 | Hauduc et al. |
| 2005/0125509 | A1 | 6/2005 | Ramachandran |
| 2005/0135246 | A1 | 6/2005 | Drouet et al. |
| 2005/0135255 | A1 | 6/2005 | Drouet et al. |
| 2005/0240905 | A1 | 10/2005 | Poumasseh et al. |
| 2005/0251562 | A1 | 11/2005 | Hauduc et al. |
| 2006/0136526 | A1 | 6/2006 | Childress et al. |
| 2006/0155527 | A1 | 7/2006 | Choi |
| 2006/0210026 | A1 | 9/2006 | Duplessis et al. |
| 2006/0218497 | A1 | 9/2006 | Chen et al. |
| 2006/0277286 | A1 | 12/2006 | Zhang et al. |
| 2007/0028214 | A1 | 2/2007 | Shu et al. |
| 2008/0097746 | A1 | 4/2008 | Tagata et al. |
| 2008/0221867 | A1 | 9/2008 | Schreiber |

FOREIGN PATENT DOCUMENTS

| | | | |
|---|---|---|---|
| JP | 2000293379 | A | 10/2000 |
| JP | 2002189627 | A | 7/2002 |
| JP | 2004310776 | A | 11/2004 |
| JP | 2005050060 | A | 2/2005 |
| JP | 2005157720 | A | 6/2005 |
| JP | 2005284742 | A | 10/2005 |
| JP | 2005316680 | A | 11/2005 |
| JP | 2006313545 | A | 11/2006 |
| WO | 0198921 | A1 | 12/2001 |

OTHER PUBLICATIONS

Go Watanabe, International Programming in X Window System, BSD Magazine, ASCII Corporation, 2000, No. 3; pp. 105-110 (national technical journal 2002-00733-009).

AIX RISC System/6000 Getting Started, Managing RISC System/6000 System Administrator Guide, 30th printing, IBM Japan, Ltd., Sep 1995, pp. 7-1 to 7-10 (manual2003-0344-001).

Partial Translation of Japanese Office Action dated Feb. 1, 2011 for JP Application No. 2007-50740, filed Feb. 28, 2007 [2 printed pages].

Manoel, Edson et al., Provisioning on Demand—Introducing IBM Tivoli Intelligent ThinkDynamic Orchestrator, IBM Redbooks, ISBN 0738498815, Dec. 2003 [494 printed pages].

* cited by examiner

| WORKFLOW : RXA-BootStrap-Server | | |
|---|---|---|
| EDIT ▼ | | |
| REFERENCE / VARIABLE / WORKFLOW | | |
| DEVICE DRIVER CURRENTLY ASSIGNED : ☐Tivoli Remote Executi | | |
| WORKFLOW NAME | LOCALE | LOGICAL DEVICE OPERATION |
| RXA_CopyFile | default | ServiceAccessPoint CopyFile |
| RXA_CopyFile_ja_JP | ja_JP | ServiceAccessPoint CopyFile |
| RXA_CopyFile_en_US | en_US | ServiceAccessPoint CopyFile |
| RXA_CopyFile_fr_FR | fr_FR | ServiceAccessPoint CopyFile |

| DEVICE DRIVER : application-topologies | |
|---|---|
| EDIT ▼ | |
| WORKFLOW / REFERENCE / VARIABLE / INFORMATION | |
| DEVICE DRIVER CURRENTLY ASSIGNED: NONE | |
| WORKFLOW NAME | LOGICAL DEVICE OPERATION |
| Application_Deploy | Application_Deploy |
| Application_Undeploy | Application_Undeploy |
| AppTopo_Cluster_AddServer | AppTopo_AddServer |
| AppTopo_Cluster_RemoveServer | AppTopo_RemoveServer |

FIG. 7

VIRTUAL CALL TABLE

| METHOD | ja_JP | WORKFLOW |
|---|---|---|
| | GROUP A | WORKFLOW |

LOCALE GROUP DEFINITION

| GROUP A | en_US |
| | GROUP B |

LOCALE GROUP DEFINITION

| GROUP B | en_AU |
| | en_BZ |
| | en_CA |

FACILITATING PROVISIONING IN A MIXED ENVIRONMENT OF LOCALES

FIELD OF THE INVENTION

The present invention relates to a provisioning technology, and more particularly to a provisioning information technology in an environment comprising a plurality of different locales.

BACKGROUND

In provisioning information technology (IT), a plurality of information IT infrastructures (e.g., servers, networks, applications, and storages) are virtualized and are each dynamically assigned from one business process to another business process in accordance with a change in workload and the like. More particularly, a management server can utilize a workflow described in a dedicated script language to transmit a set of instructions to a respective one of the plurality of IT infrastructures, to thereby assign certain business processes to the respective IT infrastructures. A software product, Tivoli Intelligent Orchestrator®, available from International Business Machines Corporation of Armonk, N.Y. is based on virtualization of the IT infrastructures and implements the provisioning, as well as the monitoring, of the IT infrastructures. It can also provide dynamic arrangement of the IT infrastructures according to a predetermined policy, and for the optimized application of the IT infrastructures.

In the case of remotely controlling the IT infrastructures by transmitting a workflow to a respective IT infrastructure from the management server, as described above, if there is a difference in locale between the management server and the IT infrastructures or between the IT infrastructures, the following countermeasures have conventionally been adopted. It is noted that the term locale generally refers to a set of language and notation rules of units, symbols, date, currency, and the like which are unique to a specific country or region and which is set in software. Further, designation of a code page (or character set) may be added to the combination of the language and the country/region as follows: ja_JP.eucJP.

Figure 10:
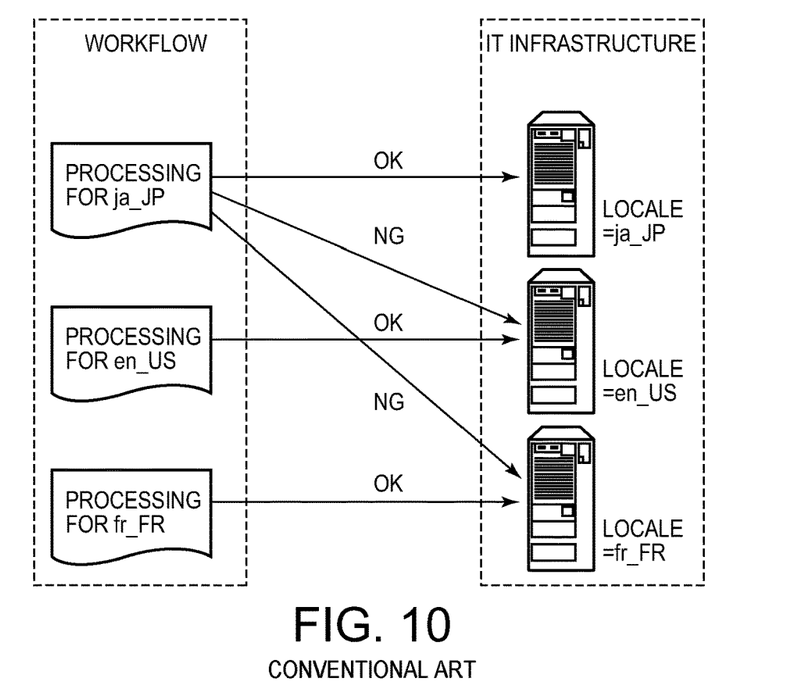
FIG. 10 is a diagram illustrating a conventional art.
Figure 11:
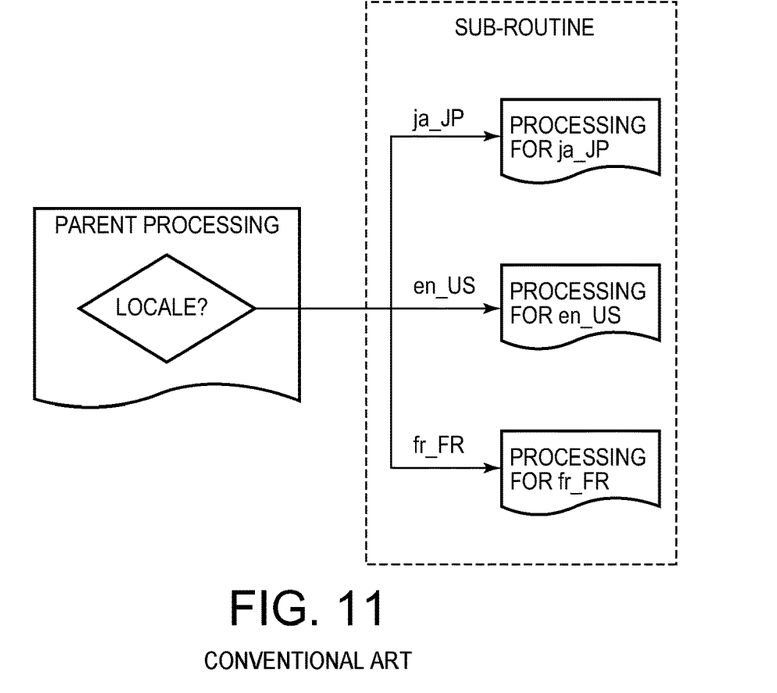
FIG. 11 is a diagram illustrating another conventional art.

According to a first countermeasure (see FIG. 10), workflows of the number corresponding to the number of locales of the IT infrastructures are prepared (three kinds of workflows for locales=ja_JP, en_US, and fr_FR, respectively, for example), and each workflow is made effective only to the IT infrastructure having the corresponding locale. Thus, the workflow for locale=ja_JP is made effective only to the IT infrastructure of locale=ja_JP, while it is made ineffective to the IT infrastructure of locale=en_US and that of locale=fr_FR. According to a second countermeasure (see FIG. 11), a workflow is divided into a portion independent from the locale and a portion dependent on the locale (locale-dependent portion), and in the workflow, conditional branching for each locale is used to call a sub-routine dependent on the corresponding locale. That is, in the parent processing of a workflow, if it is necessary to perform locale-dependent processing, the locale is determined and a sub-routine of the child processing associated with the locale (one of the three kinds of child processing for locales=ja_JP, en_US and fr_FR) is called.

With the above-described conventional countermeasures, however, there still exist technical problems. For the first countermeasure, it is necessary to prepare the workflows of the number corresponding to the number of the locales. Particularly when the number of locales is increased, it is necessary to newly prepare a workflow for each of the added locales. For the second countermeasure, although it may be unnecessary to prepare workflows of the number corresponding to the number of locales, it is still necessary to newly prepare the locale-dependent portions. Moreover, it is also necessary to hardcode the conditional branching by locales. The necessity of hardcoding of the conditional branching by locales means that such hardcoding of the conditional branching is usually required every time the number of locales increases.

SUMMARY

Certain of the aspects described herein are directed to solving the technical problems described above. According to one aspect, there is provided a management server connected via a network to a plurality of processing resources each set with a locale. The management server can include: a storage unit to store processing, a locale, and a set of instructions corresponding to the processing and the locale; and a selection unit to select a set of instructions associated with required processing and a required locale by referring to the storage unit.

According to another aspect, there is provided a computer program product, such as an optical disk, having computer-readable code embedded therein for causing a computer to function as a management server connected via a network to a plurality of processing resources each set with a locale. The computer program product, when executed, can implement in the computer: a storage function to store processing, a locale, and a set of instructions corresponding to the processing and the locale; and a selection function to select a set of instructions associated with required processing and a required locale.

According to yet another aspect, there is provided a method adapted to a system having a management server and a plurality of processing resources connected via a network, the plurality of processing resources being each set with a locale and the management server storing processing, a locale, and a set of instructions corresponding to the processing and the locale. The method can include: selecting a set of instructions associated with required processing and a required locale.

According to yet another aspect, there is provided a method adapted to a system having a management server and a plurality of processing resources connected via a network, the plurality of processing resources being each set with a locale. The method can include: converting processing and a first set of instructions corresponding to the processing, stored in the management server, into the processing, locales, and a plurality of second instructions associated with the processing and with the respective locales.

DETAILED DESCRIPTION

Figure 1:
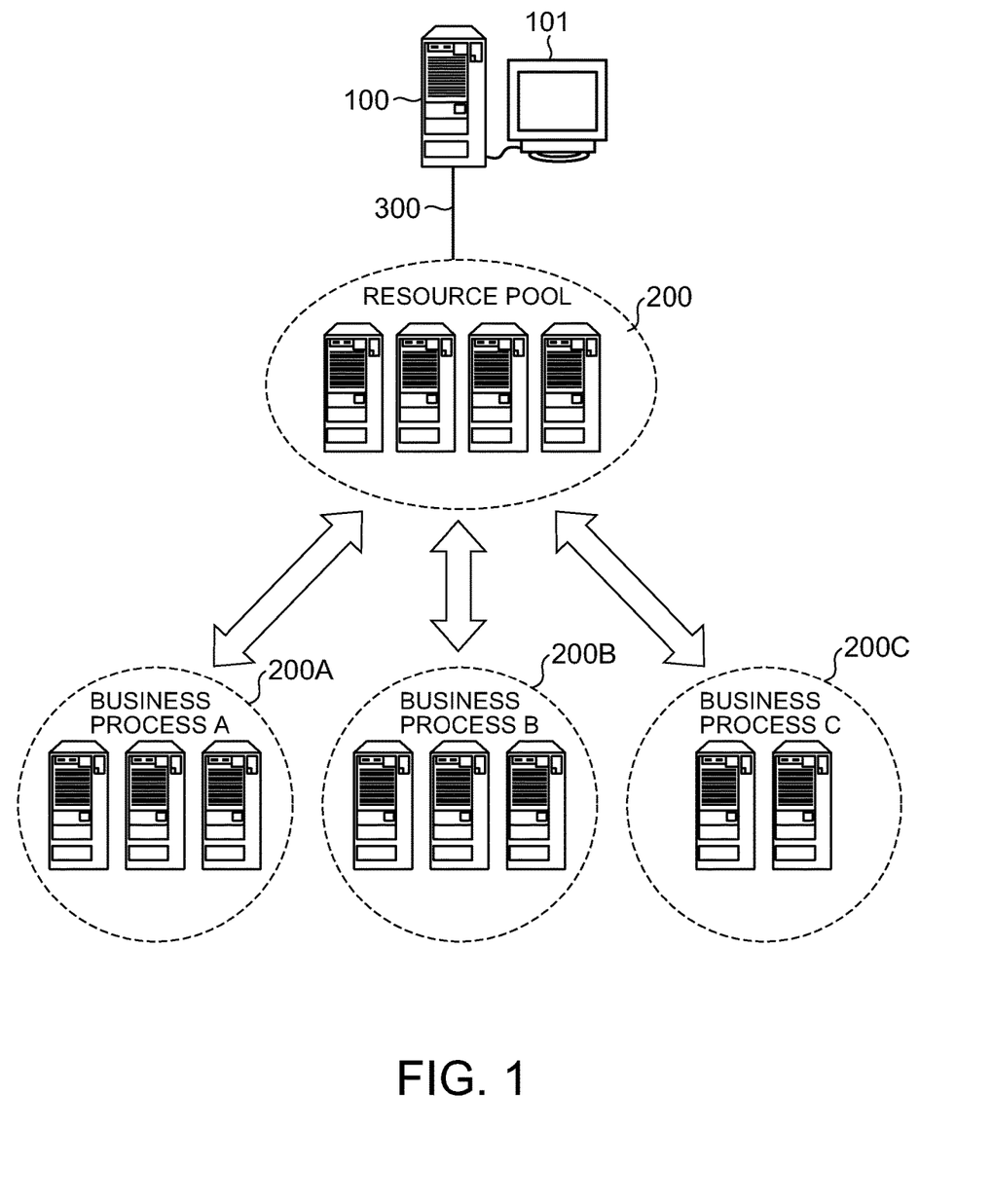
FIG. 1 is a schematic diagram of a system according to an embodiment.
Figure 2:
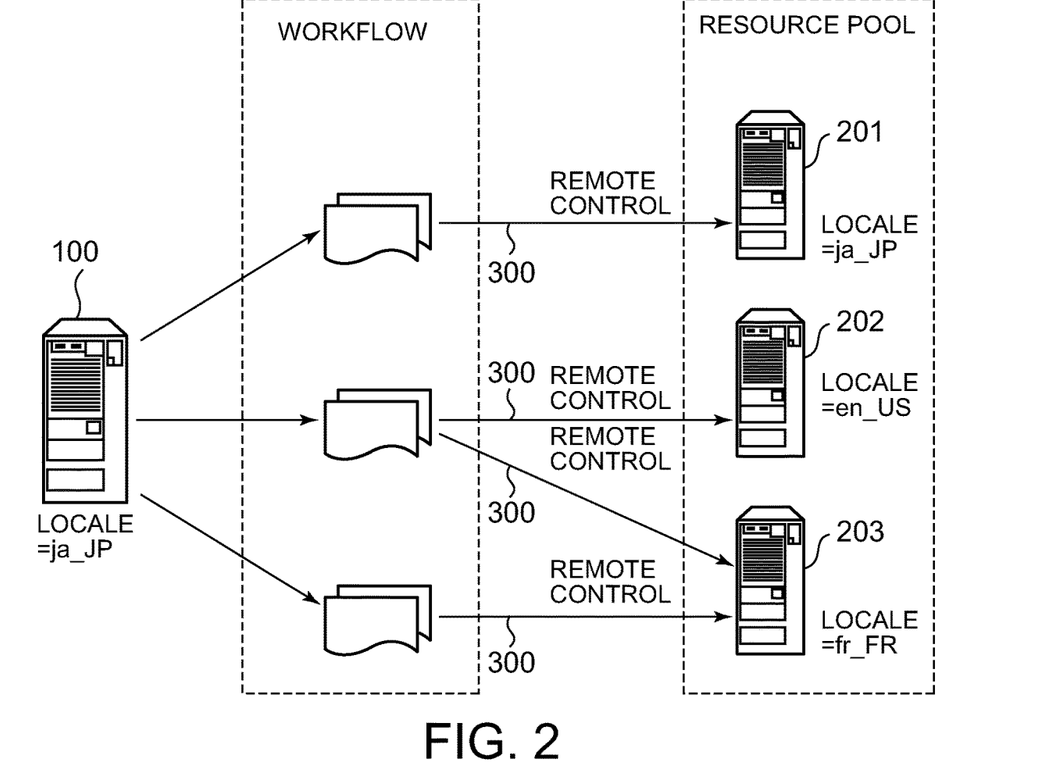
FIG. 2 is a schematic diagram illustrating a provisioning method of the system according to the embodiment.

FIGS. 1 and 2 schematically illustrate an embodiment of the present invention. A provisioning system according to the present embodiment is composed of a management server 100 and a plurality of resource servers (processing resources) 201-203, which are communicatively linked to each other via a network 300. The management server 100 and the resource servers 201-203 each have a locale set in advance, thus creating a mixed environment of a plurality of locales. More specifically, different locales are set for the respective resource servers 201-203 (for example, locale=ja_JP set for the resource server 201 indicates Japanese language, Japanese currency and the like; locale=en_US set for the resource server 202 indicates English language, U.S. currency and the like; and locale=fr_FR set for the resource server 203 indicates French language, French currency and the like). Further, the locale set for the management server 100 is ja_JP, which is different from the locales (en_US, fr_FR) of the resource servers 202 and 203. The management server 100 is provided with a monitor 101, and, although not shown, it may also be provided with an input device such as a keyboard and/or a mouse, and an output device such as a printer.

The plurality of resource servers 201-203 form a virtual resource pool, and are remotely controlled by the management server 100 to be assigned to perform any of business processes A-C or any combination thereof. To implement the remote control, the management server 100 uses a processing program code called a "workflow" described in a dedicated script language to transmit a set of instructions to a respective one of the resource servers 201-203, which in turn interprets and executes the received instructions.

In the present embodiment, a virtual call of the workflow is enhanced to dynamically and flexibly support a plurality of locales upon provisioning. Hereinafter, a more detailed implementation example of the present invention, a conventional example, and another example of the present invention will be described as an Example, a Comparative Example, and a Modification Example, respectively.

Example

Figure 3:
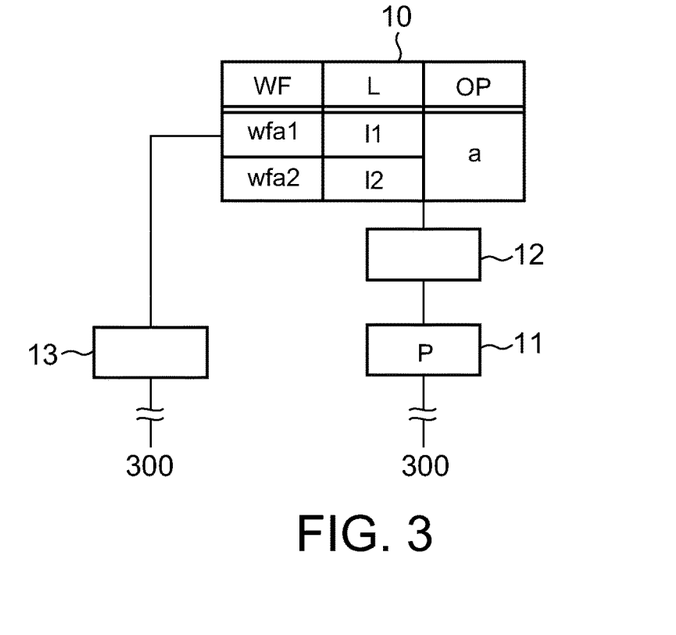
FIG. 3 is a functional block diagram of a management server 100 according to an Example.
Figure 4:
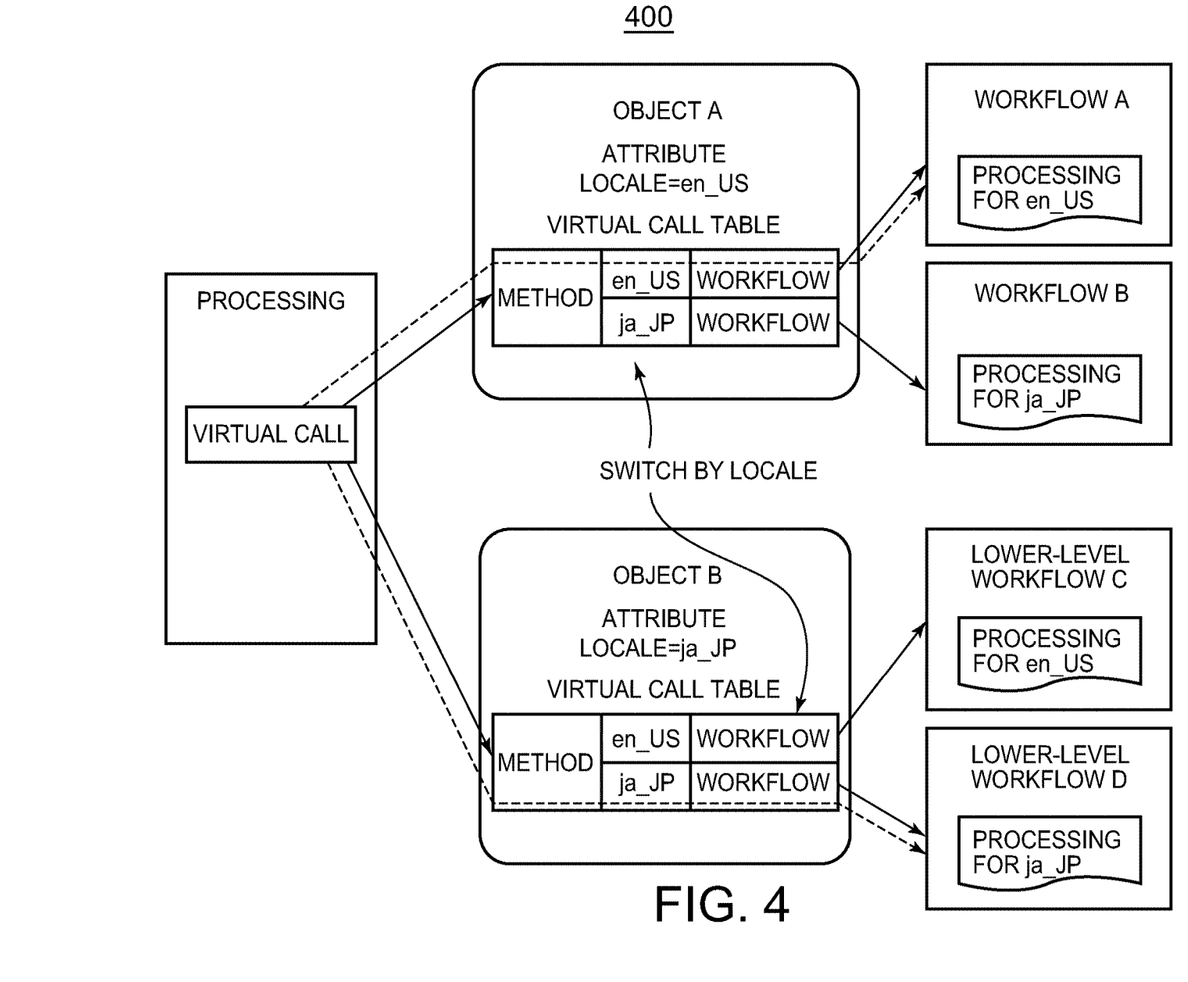
FIG. 4 is a schematic diagram illustrating virtual call of a workflow processed in the management server 100 in the Example.

FIG. 3 is a functional block diagram of a management server 100 according to an Example. FIG. 4 is a conceptual diagram illustrating virtual call of a workflow, which is processed in the management server 100 of the Example.

Figure 5:
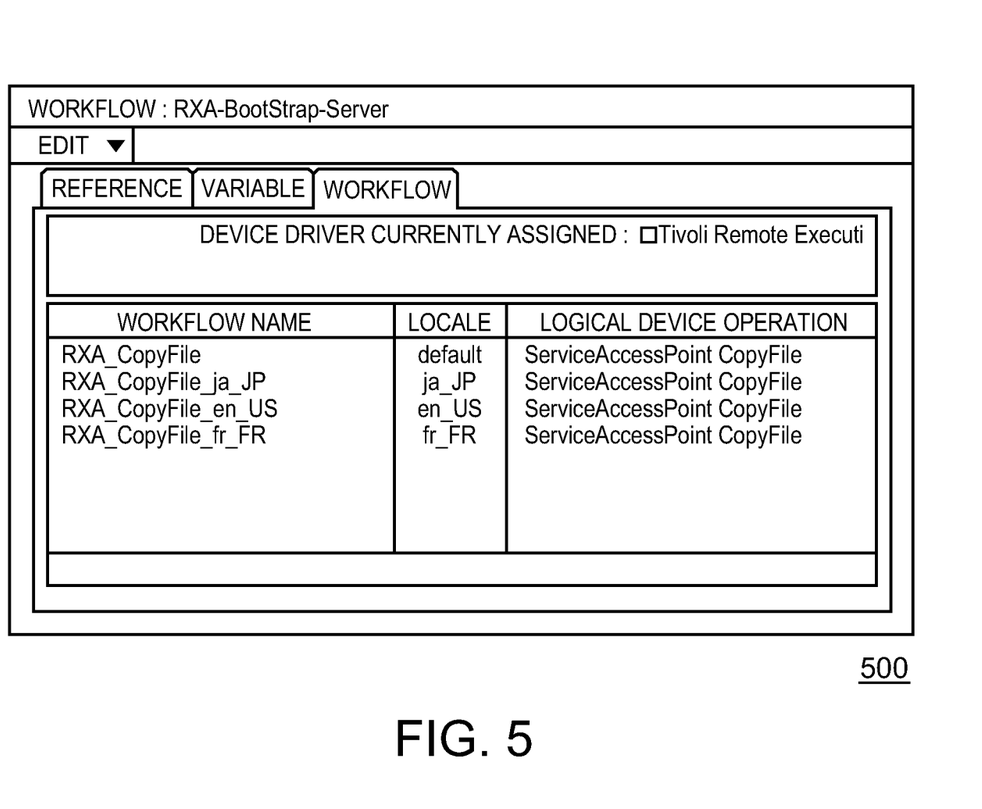
FIG. 5 is an exemplary workflow management editing screen displayed on a monitor 101 of the management server 100 in the Example.

FIG. 5 is a workflow management editing screen displayed on the monitor 101 of the management server 100 of the Example.

As shown in FIG. 3, the management server 100 includes a storage table (storage means) 10, a provisioning unit (determination means) 11, a calling unit (selection means) 12, and a transmission unit (transmission means) 13. The storage table 10 has a processing column OP, a locale column L, and a workflow column WF. The locale and the workflow (instructions) are configured as a pair, and there exist a plurality of workflows corresponding to a plurality of locales for a single processing. For example, for processing "a", there are a workflow wfa1 corresponding to a locale 11 and a workflow wfa2 corresponding to a locale 12. It should be noted that conditional branching by locales is not hard-coded in any workflow.

The provisioning unit 11 determines which processing should be assigned to which resource server, based on a policy stored in advance, as well as on a request from an administrator user, a notification of occurrence of an error in the system that is received via the network 300, a notification of the workload, or the like. For such provisioning, any techniques well known in the art can be adapted. The calling unit 12 refers to the storage table 10 based on the resource server to be assigned and its processing, which have been determined by the provisioning unit 11, to dynamically select the corresponding workflow (as described more particularly below). The transmission unit 13 uses the selected workflow to transmit the corresponding instructions to the corresponding resource server. Subsequently, the resource server that received the instructions interprets and executes the instructions, to thereby execute the corresponding processing. Upon interpretation of the instructions, conditional branching for each locale does not take place.

FIG. 4 schematically illustrates an operation of the calling unit 12 in the Example. When specific processing and a resource server (object) to execute the processing are determined, the storage table 10 is searched using the locale the resource server has as its attribute, to thereby select the corresponding workflow. For example, assuming that specific processing and the resource server 202 for executing the processing are determined, the storage table 10 is searched using the locale=en_US the resource server 202 has as its attribute, and the corresponding workflow for en_US is selected. Meanwhile, in the case where certain processing and the resource server 201 for executing the processing are determined, the locale=ja_JP, which is the attribute of the resource server 201, is used to search the storage table 10, and the corresponding workflow for ja_JP is selected.

FIG. 5 shows an example of a workflow management editing screen 500 in the Example. The management editing screen 500 is capable of listing workflows, locales, and logical device operations (processing) in the form of a table. Among them, an arbitrary item can be added, edited, or deleted. For example, it is possible to add a new locale and a corresponding workflow for a certain logical device operation. It is readily possible to create the new workflow by copying and pasting an existing workflow and editing only a portion (locale-dependent portion) corresponding to the new locale.

Comparative Example

Figure 6:
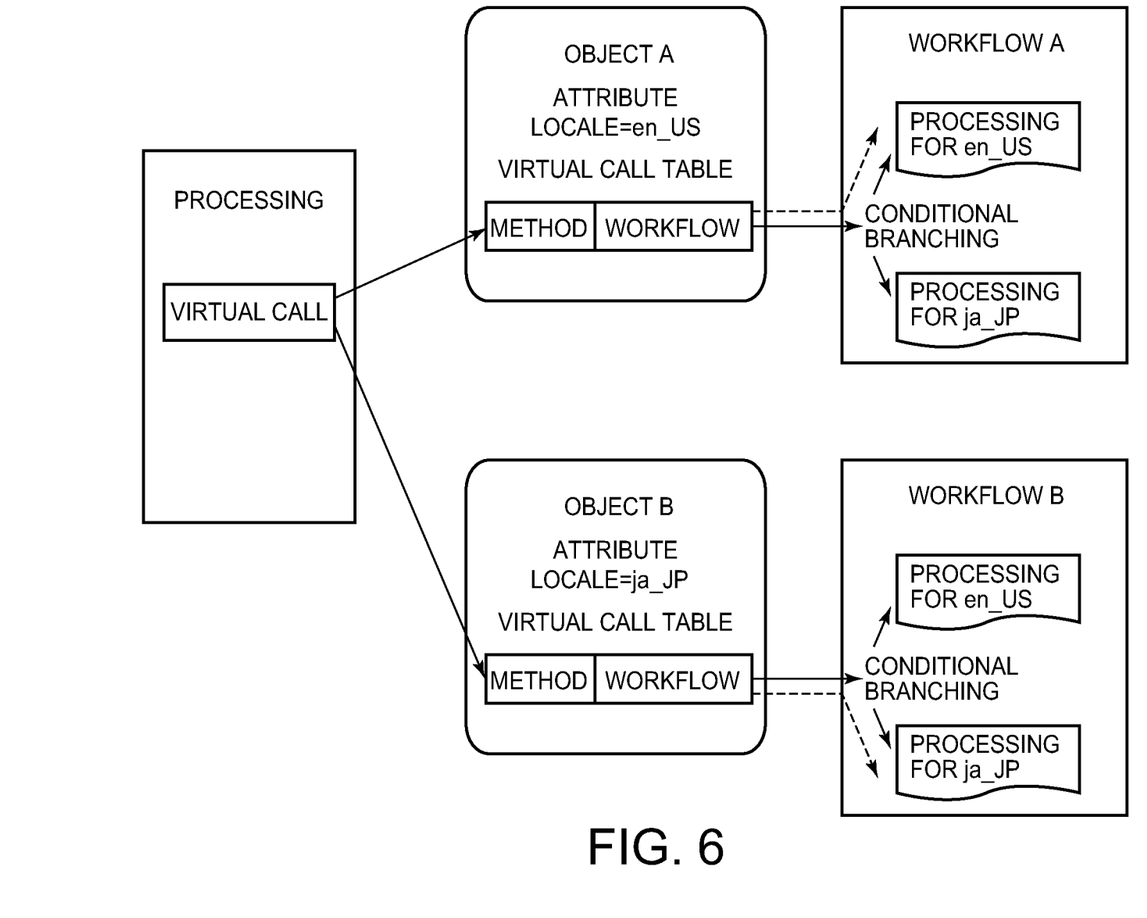
FIG. 6 is a schematic diagram illustrating virtual call of a workflow processed in a management server 100 according to a Comparative Example.
Figure 7:
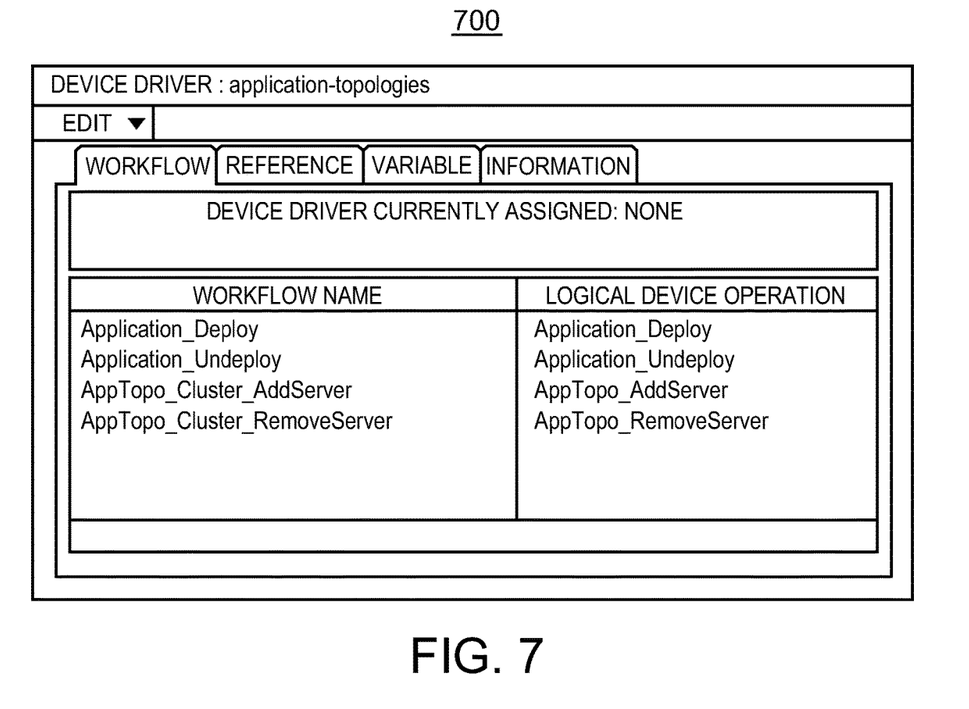
FIG. 7 is an exemplary workflow management editing screen displayed on a monitor of the management server 100 in the Comparative Example.

FIG. 6 is a schematic diagram illustrating virtual call of a workflow, which is processed in a management server in a Comparative Example. FIG. 7 is a workflow management editing screen displayed on a monitor of the management server in the Comparative Example. As shown in FIG. 6, when certain processing and a resource server (object) for executing the processing are determined, the storage table 10 is searched to select a corresponding workflow, without consideration of the locale the resource server has as its attribute. For example, assuming that certain processing and the resource server 202 for executing the processing are determined, the storage table 10 is searched, without consideration of the locale=en_US the resource server 202 has as its attribute, to select a corresponding workflow (in which there is conditional branching by locales, and a portion for the locale=en_US is selected by the conditional branching). Similarly, in the case where certain processing and the resource server 201 for executing the processing are determined, the storage table 10 is searched, without consideration of the locale=ja_JP as the attribute of the resource server 201, to select a corresponding workflow (which includes therein conditional branching by locales, and a portion for the locale=ja_JP is selected by the conditional branching).

FIG. 7 shows an example of a workflow management editing screen 700 according to the Comparative Example. In this management editing screen 700, although workflows and logical device operations (processing) can be shown in the form of a table, there is no column for locales. Further, while an arbitrary item can be added, edited or deleted among them, in the case of adding a new locale for a certain logical device operation, it is necessary to hardcode the conditional branching by the locales, in addition to adding and editing a portion (locale-dependent portion) corresponding to the new locale.

It should be noted that a locale-dependent workflow (i.e., workflow having the conditional branching by locales) (first set of instructions) shown in the Comparative Example may be converted into a plurality of locale-independent workflows (having no conditional branching by locales) for respective locales (second instructions) shown in the Example.

Modification Example

Figure 8:
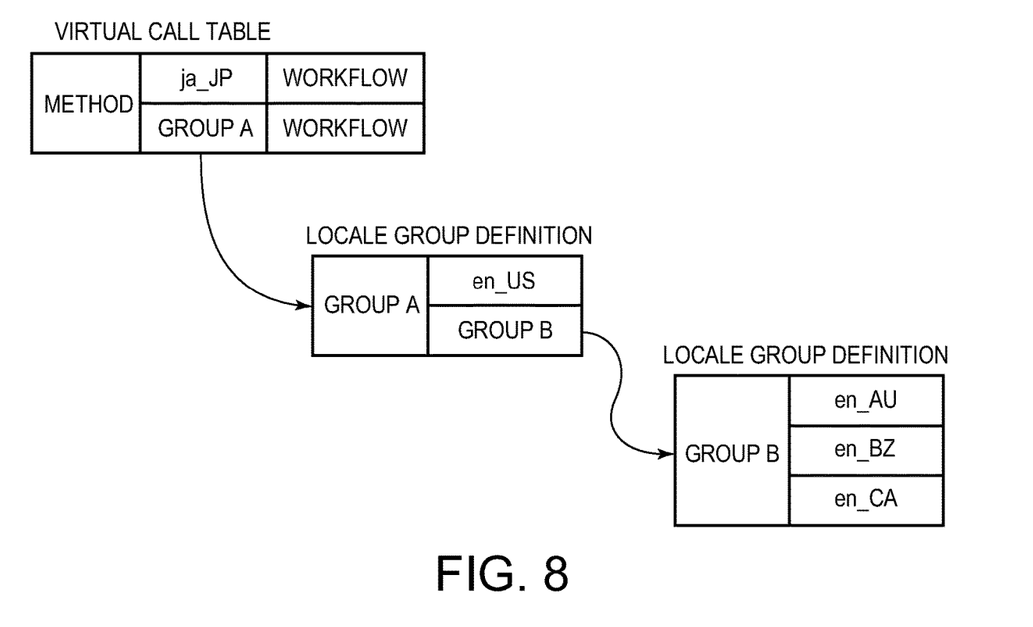
FIG. 8 is a schematic diagram illustrating virtual call of a workflow processed in a management server 100 according to a Modification Example.

It is also possible to hierarchically organize the locales stored in the storage table 10. FIG. 8 is a schematic diagram illustrating virtual call of a workflow that is processed in a management server according to a Modification Example. In the storage table 10, corresponding to a locale group (of an upper hierarchical level) called a group A, a locale=en_US and a group B (of a lower hierarchical level) are stored. Further, corresponding to the locale group (of the lower hierarchical level) called the group B, locales=en_AU, en_BZ, and en_CA are stored in the storage table 10. By hierarchically organizing the locales in the above-described manner, it is possible to further improve flexibility in definition in the virtual call table, to thereby realize considerable simplification of the definition.

Figure 9:
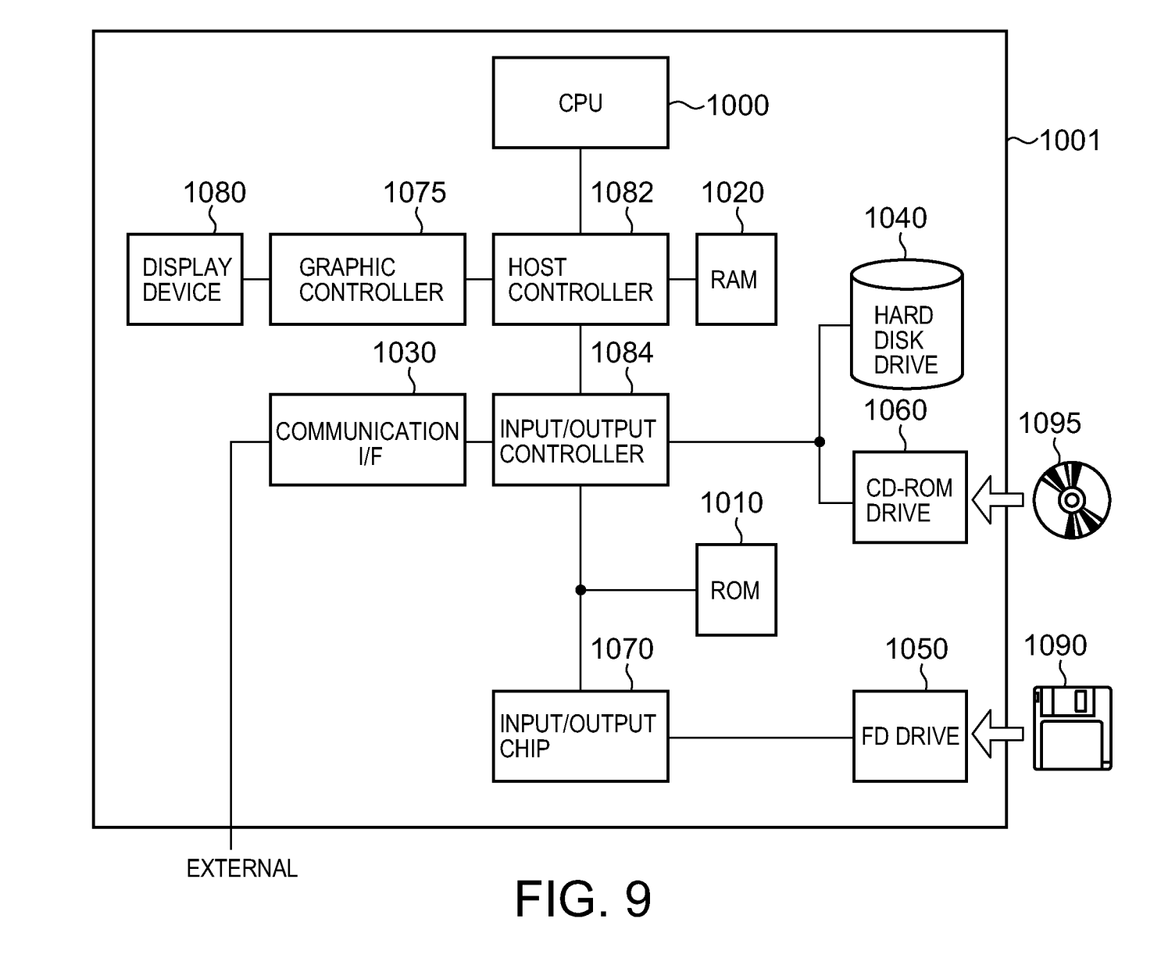
FIG. 9 is a schematic diagram of the hardware configuration of an information processing apparatus 1001 that functions as the management server 100 or one of resource servers 201-203 in the Example or the Modification Example.

FIG. 9 is a schematic view of an exemplary hardware configuration of an information processing apparatus 1001 that functions as the management server 100 or one of the resource servers 201-203 according to the Example or the Modification Example. The information processing apparatus 1001 is provided with: a CPU peripheral unit having a CPU 1000, a RAM 1020 and a graphic controller 1075, which are connected to each other via a host controller 1082; an input/output unit having a communication interface 1030, a hard disk drive 1040 and a CD-ROM drive 1060, which are connected to the host controller 1082 via an input/output controller 1084; and a legacy input/output unit having a ROM 1010, a flexible disk drive 1050 and an input/output chip 1070, which are connected to the input/output controller 1084.

The host controller 1082 connects the RAM 1020 with the CPU 1000 and the graphic controller 1075, which access the RAM 1020 at a high transfer rate. The CPU 1000 operates based on the programs stored in the ROM 1010 and the RAM 1020 to control the units. The graphic controller 1075 acquires the image data generated by the CPU 1000 and the like on a frame buffer provided in the RAM 1020, and displays the same on a display device 1080. Alternatively, the graphic controller 1075 may include therein a frame buffer that stores the image data generated by the CPU 1000 and the like.

The input/output controller 1084 connects the host controller 1082 with the communication interface 1030, the hard disk drive 1040 and the CD-ROM drive 1060, which are relatively high-speed input/output devices. The communication interface 1030 communicates with an external device via a network. The hard disk drive 1040 stores programs and data used by the information processing apparatus 1001. The CD-ROM drive 1060 reads a program or data from a CD-ROM 1095, and provides the same to the RAM 1020 or the hard disk drive 1040.

The input/output controller 1084 is also connected with the ROM 1010, and with the flexible disk drive 1050 and the input/output chip 1070, which are relatively low-speed input/output devices. The ROM 1010 stores a boot program executed by the CPU 1000 upon activation of the information processing apparatus 1001, and a program that depends on the hardware of the information processing apparatus 1001. The flexible disk drive 1050 reads a program or data from a flexible disk 1090, and provides the same to the RAM 1020 or the hard disk drive 1040 via the input/output chip 1070. The input/output chip 1070 connects various input/output devices via the flexible disk 1090 or a parallel port, serial port, keyboard port, mouse port and the like.

The program provided to the information processing apparatus 1001 is stored in a recording medium such as the flexible disk 1090, the CD-ROM 1095 or an IC card, and is provided by the user. The program is read from the recording medium via the input/output chip 1070 and/or the input/output controller 1084, and installed to the information processing apparatus 1001 for execution. The operation that the program causes the information processing apparatus 1001 to execute is identical to the operation of the management server 100 or one of the resource servers 201-203 explained above, and thus, description thereof will not be repeated.

The program as described above may be stored in an external storage medium. The storage medium may be, besides the flexible disk 1090 and the CD-ROM 1095, an optical recording medium such as a DVD or PD, a magneto-optical recording medium such as an MD, a tape medium, or a semiconductor memory such as an IC card. Further, the storage device such as a hard disk or a RAM provided in a server system connected to a dedicated communication network or the Internet may be used as the recording medium, in which case the program may be provided to the information processing apparatus 1001 via the network.

As described herein, these aspects provide various advantages, primarily technical advantages including the following: hardcoding for locale-switching processing is unnecessary; it is possible to readily increase or decrease the number of locales to be supported; and it is possible to achieve an efficient aggregation of the locale-dependent codes.

While the present invention has been described above in conjunction with the embodiment, the technical scope of the present invention is not restricted to the scope of description of the embodiment above. It is apparent for a person skilled in the art that, besides the Example and the Modification Example described above, various modifications or improvements are possible for the above-described embodiment. It is evident from the description of the scope of the claims for patent that such modified or improved embodiments may be included in the technical scope of the present invention.

What is claimed is:

1. A method comprising:
   for each resource server computer among a plurality of resource server computers connected to a management server computer, setting a locale for the resource server computer such that no two resource server computers among the plurality of resource server computers are set with a same locale;
   selecting, by the management server computer, a first resource server computer among the plurality of resource server computers to perform a first logical device operation among a plurality of logical device operations;
   assigning, by the management server computer and by way of provisioning, the performance of the first logical device operation to the first resource server computer; and
   selecting, by the management server computer, a workflow among a plurality of workflows for the first logical device operation based upon the locale set for the first resource server computer.

2. The method of claim 1, further comprising:
   performing, by the first resource server computer, the first logical device operation.

3. The method of claim 1, wherein the provisioning is carried out based on a policy set in advance and a notification of occurrence of an error in an associated system.

4. The method of claim 1, wherein the provisioning is carried out based on a policy set in advance and a notification of an associated workload.

5. A management server computer comprising:
   a provisioning circuit configured to select a first resource server computer among a plurality of resource server computers connected to the management server computer to perform a first logical device operation among a plurality of logical device operations and further configured to assign the performance of the first logical device operation to the first resource server computer by way of provisioning, wherein, for each resource server computer among the plurality of resource server computers, a locale among a plurality of locales is set for the resource server computer such that no two resource server computers among the plurality of resource server computers are set with a same locale; and
   a calling circuit configured to select a workflow among a plurality of workflows for the first logical device operation based upon the locale set for the first resource server computer.

6. The management server computer of claim 5, wherein the provisioning is carried out based on a policy set in advance and a notification of occurrence of an error in an associated system.

7. The management server computer of claim 5, wherein the provisioning is carried out based on a policy set in advance and a notification of an associated workload.

8. The management server computer of claim 5, wherein the plurality of locales are hierarchically organized to comprise at least one upper-level locale and at least one lower-level locale, and wherein each of the at least one lower-level locale is defined within a locale group referenced one hierarchical level above the lower-level locale.

9. The management server computer of claim 5, wherein the plurality of locales and the plurality of workflows are editable independently from each other.

10. The management server computer of claim 5, wherein an additional locale is capable of being added to the plurality of locales, and wherein an additional workflow corresponding to the additional locale is capable of being added to the plurality of workflows.

11. A computer program product on a non-transitory recording medium, the computer program product comprising computer-readable instructions, which, when loaded in and executed by a management server computer, causes the management server computer to perform steps of:
   selecting a first resource server computer among a plurality of resource server computers connected to the management server computer to perform a first logical device operation among a plurality of logical device operations, wherein, for each resource server computer among the plurality of resource server computers, a locale among a plurality of locales is set for the resource server computer such that no two resource server computers among the plurality of resource server computers are set with a same locale;
   assigning the performance of the first logical device operation to the first resource server computer by way of provisioning; and
   selecting a workflow among a plurality of workflows for the first logical device operation based upon the locale set for the first resource server computer.

12. The computer program product of claim 11, wherein the provisioning is carried out based on a policy set in advance and a notification of occurrence of an error in an associated system.

13. The computer program product of claim 11, wherein the provisioning is carried out based on a policy set in advance and a notification of an associated workload.

14. The computer program product of claim 11, wherein the plurality of locales are hierarchically organized to comprise at least one upper-level locale and at least one lower-level locale, and wherein each of the at least one lower-level locale is defined within a locale group referenced one hierarchical level above the lower-level locale.

15. The computer program product of claim 11, wherein the plurality of locales and the plurality of workflows are editable independently from each other.

16. The computer program product of claim 11, wherein an additional locale is capable of being added to the plurality of locales, and wherein an additional workflow corresponding to the additional locale is capable of being added to the plurality of workflows.

* * * * *